United States Patent
Gray, Jr.

(10) Patent No.: US 8,069,657 B2
(45) Date of Patent: Dec. 6, 2011

(54) DIESEL PARTICULATE FILTER REGENERATION SYSTEM

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 851 days.

(21) Appl. No.: 12/156,692

(22) Filed: Jun. 4, 2008

(65) Prior Publication Data

US 2009/0019839 A1    Jan. 22, 2009

Related U.S. Application Data

(60) Provisional application No. 60/933,288, filed on Jun. 5, 2007.

(51) Int. Cl.
  *F02K 3/00*    (2006.01)
  *F02B 27/04*   (2006.01)
  *F01N 5/00*    (2006.01)

(52) U.S. Cl. .............. 60/295; 60/273; 60/280; 60/292

(58) Field of Classification Search ............ 60/273–324; 55/282
See application file for complete search history.

(56) References Cited

U.S. PATENT DOCUMENTS

| | | | |
|---|---|---|---|
| 5,517,976 A * | 5/1996 | Bachle et al. ............ | 123/568.11 |
| 5,711,149 A * | 1/1998 | Araki ..................... | 60/278 |
| 6,090,187 A * | 7/2000 | Kumagai ................. | 95/278 |
| 7,100,365 B2 * | 9/2006 | Nishizawa et al. .......... | 60/285 |
| 7,185,489 B2 * | 3/2007 | Kolstad et al. ............ | 60/297 |
| 7,473,288 B2 * | 1/2009 | Toyoda et al. ............. | 55/282.3 |
| 7,550,119 B2 * | 6/2009 | Kojima .................... | 422/180 |
| 2002/0155039 A1* | 10/2002 | Itoh et al. ................. | 422/171 |
| 2007/0130946 A1* | 6/2007 | Winsor et al. ............. | 60/605.1 |
| 2010/0211292 A1* | 8/2010 | Geyer et al. .............. | 701/108 |

FOREIGN PATENT DOCUMENTS

| | | | | |
|---|---|---|---|---|
| JP | 59070826 A | * | 4/1984 | |
| JP | 59074319 A | * | 4/1984 | |
| JP | 59079024 A | * | 5/1984 | |
| JP | 59082515 A | * | 5/1984 | |
| JP | 05079317 A | * | 3/1993 | |
| JP | 2000 213 329 A | | 8/2000 | |
| JP | 2000213329 A | * | 8/2000 | |
| JP | 2005069238 A | * | 3/2005 | |
| JP | 2006046252 A | * | 2/2006 | |

OTHER PUBLICATIONS

Translated JP59082515 to Matsuoka et al.; Diesel Engine Exhaust Gas Purification Device.*

* cited by examiner

*Primary Examiner* — Kenneth Bomberg
*Assistant Examiner* — Anthony Ayala Delgado
(74) *Attorney, Agent, or Firm* — David H. Read

(57) ABSTRACT

A diesel combustion engine comprises multiple particulate filters and corresponding exhaust piping and valving in the exhaust manifold and/or exhaust line, configured to enable regeneration to occur in one of the DPF filters through heating the exhaust from a single cylinder of the engine, while the exhaust from the remaining cylinders is temporarily routed through the other DPF filter during the regeneration event. Flow redirection devices are placed within the DPF filters to direct flow of exhaust gas through the DPF filters during regeneration in a manner to facilitate complete regeneration, including in outer volumes along the interior walls of the DPF filters.

8 Claims, 2 Drawing Sheets

DIESEL PARTICULATE FILTER REGENERATION SYSTEM

This application claims priority from U.S. provisional application 60/933,288, "Diesel Particulate Filter Regeneration System," filed Jun. 5, 2007.

FIELD OF THE INVENTION

This invention relates to devices and methods for active regeneration of diesel particulate filters, for efficient emissions reduction for diesel engine exhaust.

BACKGROUND AND DESCRIPTION OF THE PRIOR ART

Diesel particulate filters (aka DPFs or PM filters) are gaining acceptance for reducing emissions of harmful particulate matter (PM) from diesel internal combustion engines. DPFs are an aftertreatment technology, generally being placed in the exhaust line downstream of the engine to catch particulate matter within the filter to prevent the harmful material from being released into the atmosphere.

In some circumstances, active regeneration of the DPF is needed to clear the DPF of accumulated particulate matter so that the DPF can continue to operate effectively in removing additional PM from the engine exhaust gas. Regeneration generally occurs by burning off the accumulated particulate matter. Known methods to regenerate a DPF include the use of an electrical resistance heater, and/or the use of an additional injection of fuel, to increase exhaust gas temperatures through the DPF. The high exhaust gas temperature, together with excess oxygen in the exhaust, combine to oxidize the carbon and organic PM in the filter, thereby producing carbon dioxide. A diesel oxidation catalyst (DOC) is also sometimes placed upstream of the filter. As the oxidation reaction in the DOC is exothermic, placement of the DOC upstream of the filter results in increasing the exhaust temperature through the filter, for improved filter regeneration.

Nevertheless, by requiring electrical energy and/or the use of additional fuel, each of these active regeneration methods reduce the overall fuel efficiency of the internal combustion engine system. The energy lost in DPF regeneration can become particularly significant in engine systems with relatively cool exhaust temperatures and/or with particularly high engine-out PM levels, such as low temperature diesel combustion systems that use high levels of exhaust gas recirculation for reduced emissions of NOx.

It is therefore desirable in the art to provide an apparatus and methods for effective DPF regeneration with a reduced fuel efficiency penalty. While some have already advocated one way of improving the efficiency of DPF regeneration, by routing just a small portion of exhaust gas through the DPF during regeneration and bypassing the remainder of the exhaust gas around the DPF (see, e.g., U.S. Pat. No. 4,744,216 to Rao, U.S. Pat. No. 5,063,737 to Lopez-Crevillen, and U.S. Pat. No. 4,276,066 to Bly), such prior systems would result in (i) an increase in emissions during the regeneration process, and/or (ii) potential significant complication of engine management strategies occasioned by significant changes in combustion and exhaust characteristics in each of the engine's cylinders during the regeneration event.

OBJECT OF THE INVENTION

It is therefore an object of the present invention to provide a system for active regeneration of diesel particulate filters with a reduced fuel efficiency penalty and with minimal disruption to low temperature combustion engine management strategies.

It is a further object of the present invention to provide a system for active regeneration of diesel particulate filters particularly suited for low temperature diesel combustion engines.

SUMMARY OF THE INVENTION

In a first embodiment of the invention, a low temperature diesel combustion engine is provided with more than one DPF filter and corresponding exhaust piping and valving in the exhaust manifold and/or exhaust line configured to enable regeneration to occur in one of the DPF filters through heating the exhaust from a single cylinder of the engine, while the exhaust from the remaining cylinders is temporarily routed through the other DPF filter during the regeneration event.

In a second embodiment of the invention, a flow redirection device is placed within each DPF filter, to direct flow of exhaust gas through the DPF filter in a manner to improve the efficiency of the DPF filter regeneration.

DETAILED DESCRIPTION OF THE INVENTION

Figure 1:
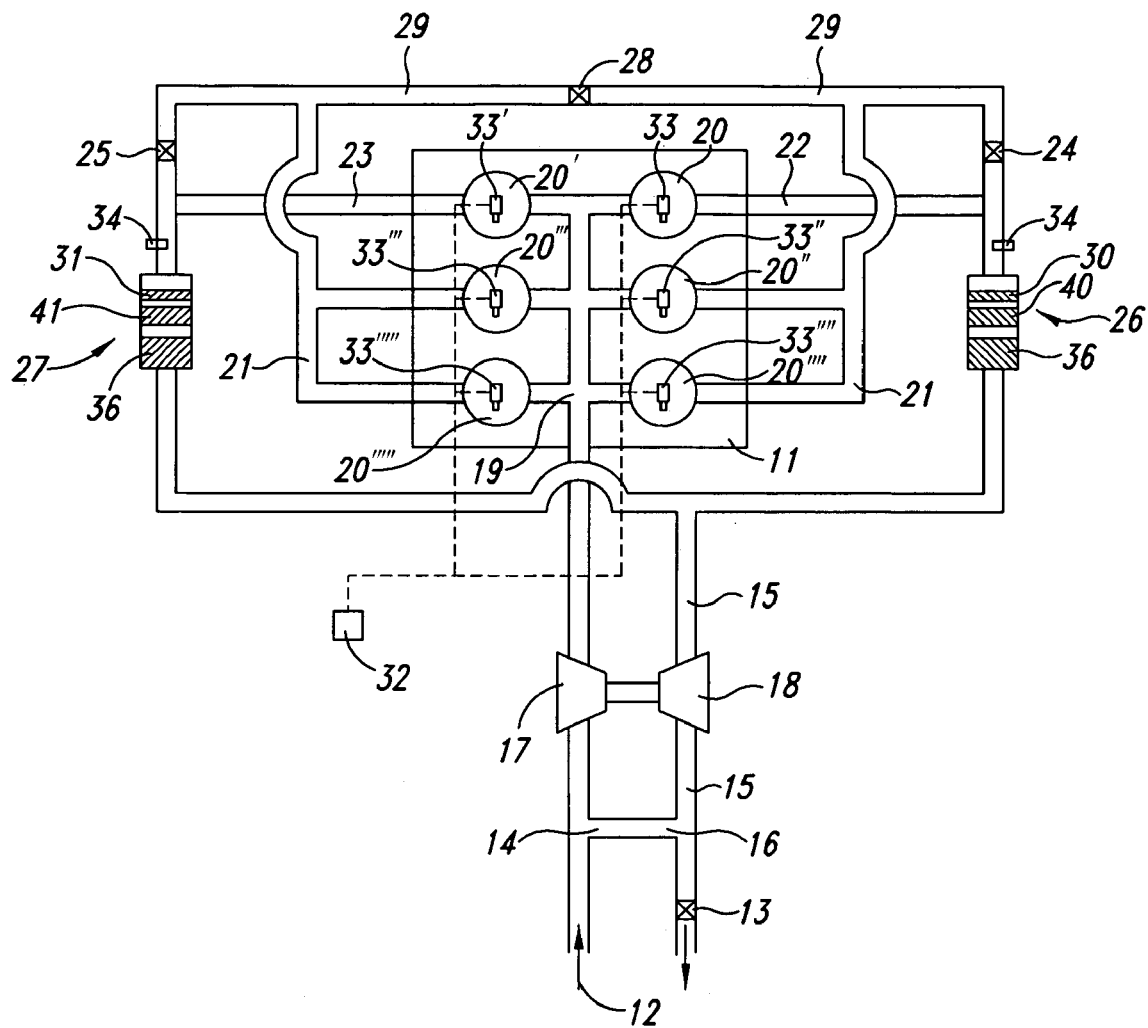
FIG. 1 presents a schematic view of an internal combustion engine system of the present invention.

FIG. 1 portrays a preferred embodiment for the present invention. Intake air enters the intake system at port 12. Exhaust gas is mixed with the intake air (forming a charge-air mixture) at port 14, with EGR control valve 13 in the exhaust line 15 adjustably creating an exhaust backpressure to force exhaust gas to flow through port 16 to port 14 in a desired amount. The charge-air then flows through low pressure compressor 17, which may be driven, by turbine/motor 18. Alternatively, a multi-stage turbocharging system or other boost system may be used, as will be known in the art.

Continuing with FIG. 1, the charge-air eventually enters engine 11 through intake manifold 19. Engine 11 comprises a plurality of combustion cylinders 20, 20', 20", 20''', etc formed in the engine block, as known in the art. The total number of cylinders utilized may be any number desired for the application. The charge-air enters a combustion chamber (not shown) of each respective cylinder 20, 20', 20", etc through intake valves (not shown). Fuel injection system controller 32 controls fuel injection timing and quantity for each cylinder based on feedback from sensors (not shown), with fuel injection occurring through fuel injectors 33, 33', 33", etc. . . . Combustion occurs and the exhaust gases exit each combustion chamber through exhaust valves (not shown).

As can be seen in FIG. 1, the paths of the exhaust gases from the combustion cylinders to the exhaust line 15 differ from the prior art. In particular, the exhaust gas from a sub-plurality of the combustion cylinders (meaning a plurality of cylinders—e.g., cylinders 20", 20''', 20"", and 20''''' in FIG.

1—but less than the total number of combustion cylinders for the combustion system) exits through one or more exhaust manifolds 21, 21' to respective exhaust lines upstream of exhaust flow control valves 24 and/or 25. In contrast, exhaust gas from one or more other combustion cylinders (i.e., a second quantity of cylinders—e.g., cylinders 20 and 20' in FIG. 1) exits through separate channels 22 and 23 to exhaust lines downstream of flow control valves 24 and 25, directly before passing through aftertreatment devices 26 and 27. For the embodiment of FIG. 1, a third flow control valve 28 is further positioned in cross-channel 29 for additional control of exhaust flow. Aftertreatment devices 26 and 27 each may contain an electrical resistance heater (30, 31) and/or a diesel oxidation catalyst (DOC) (40, 41) upstream of a particulate filter (36, 36').

Control of exhaust flow in the combustion system of FIG. 1 may now be discussed. As can be seen in FIG. 1, in the normal condition that valve 28 is closed while valves 24 and 25 are open, exhaust flow is evenly divided between aftertreatment devices 26 and 27, with exhaust from cylinders 20, 20", and 20"" flowing through aftertreatment device 26, while exhaust from cylinders 20', 20''', and 20""' flows through aftertreatment device 27. In the normal condition (i.e., neither aftertreatment device is in need of regeneration), this maintains the respective PM loading of traps 26 and 27 approximately equal.

However, in a second condition, with valve 25 closed and valves 28 and 24 open, such as in the case that particulate filter 27 is in need of regeneration, it can be seen that only exhaust gas from cylinder 20' flows through DPF 27, while exhaust from the remaining cylinders 20, 20", 20''', 20"", 20""' flows through DPF 26. Conversely, in a third condition, with valve 24 closed and valves 28 and 25 open, such as in the case that particulate filter 26 is in need of regeneration, it can be seen that only exhaust gas from cylinder 20 flows through DPF 26, while exhaust from the remaining cylinders 20', 20", 20''', 20"", 20""' flows through DPF 27.

Referring to the second condition above, with or without fuel addition from a metering means (not shown) in exhaust channel 23 or from late injection from injector 33', resistive heating element 31 may then be utilized to heat the exhaust from single cylinder 20' to effect regeneration of DPF 27. Conversely, in the third condition above, with or without fuel addition from a metering means (not shown) in exhaust channel 22 or from late injection from injector 33, resistive heating element 30 may then be utilized to heat the exhaust from single cylinder 20 to effect regeneration of DPF 26. As an example for each case, the exhaust may be heated to a temperature in excess of 650 degrees Celsius to ensure DPF regeneration. As may be needed, fuel addition would be oxidized over catalyst 40 or 41 as appropriate to achieve the target regeneration temperature. Exhaust lines 22 and 23 may further be insulated to conserve exhaust heat, and thus reduce the heating effort, if desired.

Valve control for switching between the various conditions may be effectuated through a valve controller (not shown), based on information received from optional monitoring devices 34 and 34' which monitor the need for regeneration of the particulate filters. For example, the monitoring devices may be pressure sensor/transducers for sensing backpressure upstream of the filter (which pressure correlates with the extent of PM loading in the particulate filter downstream of the sensor) to determine the need for regeneration of the corresponding particulate filter. When the degree of particulate collection in the filter reaches a preset trigger condition indicating a need for the particulate filter to be regenerated, the valve controller then operates to change the exhaust flow as appropriate (e.g., as described for the second or third conditions above) for regeneration. Exhaust flow is controlled through any appropriate valve actuation means as are well-understood in the art.

One benefit of the arrangement of the present invention as described with respect to FIG. 1 is the reduced energy loss in regenerating the DPFs, which energy savings comes from the reduced mass flow through the regenerating DPF, meaning that the heater in the aftertreatment device, or oxidizing added fuel, may heat a smaller quantity of exhaust gas to effect regeneration. For instance, applicant has found that the energy required to heat exhaust gas from a single cylinder for regeneration is much less than the energy required to bring about regeneration through heating the exhaust from multiple cylinders for each DPF.

A second benefit of the arrangement of the present invention is that it allows for separate control of the single combustion cylinder used in regeneration. Thus the single cylinder can be operated differently if needed for improved efficiency of the regeneration process; for example, by controlling the single cylinder to have a greater amount of excess oxygen, or added fuel in its exhaust gas, to facilitate the regeneration process. The desired difference is because sufficient exhaust oxygen concentration is needed in the flow of exhaust through the regenerating DPF to enable combustion propagation for the regeneration process. Added fuel from the single cylinder further facilitates the regeneration process by increasing the resulting exhaust temperature when passed through a diesel oxidation catalyst upstream of the filter. In addition, combustion changes for regeneration on a single cylinder causes fewer problems in engine management for clean diesel combustion, e.g. in managing exhaust oxygen concentrations, EGR flow rates, intake oxygen concentrations, etc within the internal combustion engine system, as will be explained in greater detail hereafter.

Therefore, in summary, DPF regeneration herein preferably occurs by (i) the use of exhaust from a single combustion cylinder for regeneration, to reduce mass flow, (ii) engaging the heater to achieve a desired temperature setpoint (e.g., 650 degrees Celsius or more), and (iii) providing added fuel to the dedicated cylinder exhaust to improve DPF regeneration. Fuel for the dedicated cylinder during a regeneration event is preferably performed by split injection. For example, the first (primary) fraction of fuel may be provided to produce the indicated cylinder power while the remaining (post) fuel injection provides fuel to react across the aftertreatment device's heater and/or diesel oxidation catalyst. The fuel split between the two injections could be made equal or even larger for the post injection if desired. Preferably, the dedicated cylinder is managed such that the provision of added fuel to its exhaust not only provides combustible fuel across the heater/catalyst but also increases the exhaust oxygen concentration produced for carbon oxidation within the DPF.

In tests, use of the dedicated cylinder under the methods described above significantly reduced the energy needed to heat exhaust gas sufficiently for DPF regeneration in a low temperature diesel combustion engine system.

Returning to FIG. 1, after passing through aftertreatment devices 26 and 27, exhaust gas in the engine system flows through exhaust line 15 through turbine/motor 18 before discharge to ambient air. It will be understood that various sensors may also be provided in locations throughout the internal combustion system of FIG. 1, to detect information useful for engine system control, including but not limited to oxygen concentrations, air temperatures, cylinder pressures, etc. For brevity's sake, such sensors and control systems are not discussed here but will be understood in the art.

As more fully disclosed in commonly-owned U.S. Pat. No. 6,857,263 and pending U.S. application Ser. No. 11/389,385, for low temperature diesel combustion systems, it can be desirable to maintain exhaust oxygen concentrations in the combustion system relatively constant and at a relatively low concentration level. However, this creates a problem for regeneration of particulate filters in such combustion systems, as excess exhaust oxygen is desired for efficient regeneration. Thus the single combustion cylinder herein that produces exhaust gas flow through the filter in need of regeneration is preferably operated during regeneration conditions to produce a higher exhaust oxygen concentration than the remaining cylinders. As an example, the dedicated cylinder could be controlled to produce a 5-6% exhaust oxygen concentration, instead of (for example) a 2-4% exhaust oxygen concentration from the remaining cylinders. Further, the dedicated cylinder may be controlled to produce a higher exhaust temperature (e.g., about 550 degrees Celsius) than the remaining cylinders. In such a situation, when the exhaust from the dedicated cylinder is passed through the diesel oxidation catalyst (40, 41) and heater (30, 31), it will then raise the exhaust temperature in the flow to a temperature (e.g., 700-800 degrees Celsius) desired for efficient and rapid regeneration of the DPF. The events of passing the exhaust gas through the DOC and DPF will simultaneously reduce the oxygen concentration, preferably down to a level (e.g., 2% or less) similar to the rest of the exhaust in the engine system. By having the final resulting oxygen concentration not too much different than the exhaust from the rest of the cylinders (which continue to provide relatively constant exhaust oxygen concentration), there will be little or no interference or delay with the engine system's control of intake oxygen concentration for continued control of in-cylinder NOx formation in such systems.

Figure 2:
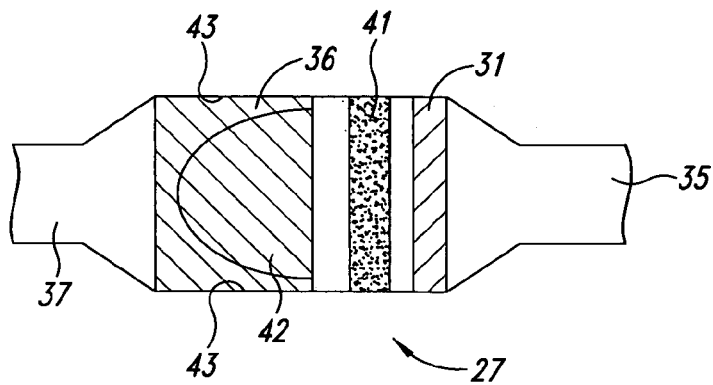
FIG. 2 presents a sectional view of a prior art aftertreatment device with DPF filter, taken along the length of the aftertreatment device.

FIG. 2 next presents a cross-sectional view of a prior art aftertreatment device 27 (or 26) that may be used in conjunction with the internal combustion engine system of the present invention. Exhaust air enters the DPF filter at port 35. The exhaust air is then heated as needed by electrical resistance heater 31 and by exothermic reaction in DOC 41 before passing through filter element 36. The locations of heater 31 and DOC 41 may be switched if desired. The exhaust then exits the DPF filter 27 through port 37 to exhaust line 15 of the internal combustion engine system.

Figure 4:
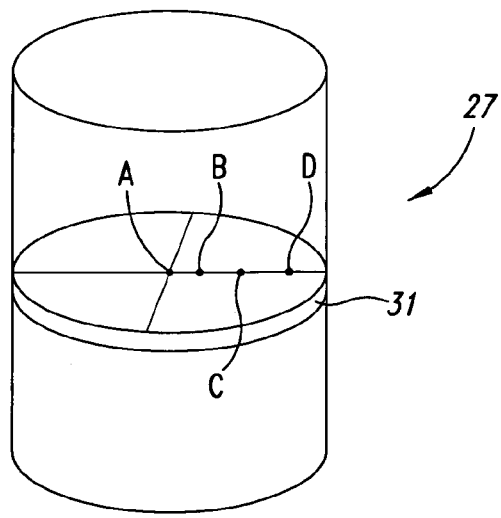
FIG. 4 depicts a cross-section of a heater within a DPF filter.

Referring again to FIG. 2, it is known that in pipe laminar flow, especially at low flow rates, the gas flow velocity profile is similar to a parabolic curve. Through a DPF the flow of exhaust is understood to take a similar shape, as roughly represented by the parabolic curve 42 in FIG. 2. Therefore the outside volumes for exhaust flow within the filter 36 (e.g. closer to the interior walls 43) experience less exhaust pass-through and receive less energy. At the same time, more importantly, these outer volumes along the walls 43 lose relatively more energy due to heat transfer. Further, some heaters 31 reach a higher heat at the interior of the heating coil and significantly lower temperatures at the periphery of the heater. The resulting thermal gradients from these factors within a particulate filter 36 can be as much as 100 degrees Celsius per centimeter, between, for example, points B and C in FIG. 4. This results in DPFs failing to completely regenerate, leaving "soot rings" on the outer radius of the filter, and can cause thermal cracking and failure of the filter.

Figure 3:
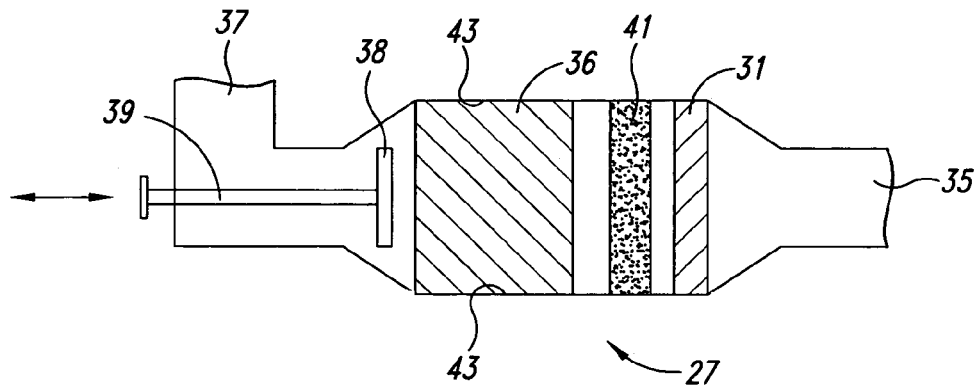
FIG. 3 presents a sectional view of an aftertreatment device with DPF filter according to the invention, taken along the length of the aftertreatment device.

Particularly with low temperature combustion diesel engines, complete regeneration of the DPF near the walls of the DPF can be assisted by the addition of a flow redirection device, which also reduces the mass of the DPF which must be heated to the target regeneration temperature. A preferred flow redirection device is shown in FIG. 3 as block plate 38. Alternative flow redirection devices (e.g., shrouds, adjustable vanes, or flow guiding devices directly upstream of filter 36) could be used. Block plate 38 is a substantially solid (short cylindrical) plate, with a stem 39 extending from the backside of the plate toward outside of the DPF to facilitate slidable axial movement of the block plate 38 within the DPF. By slidably moving block plate 38 into the DPF toward filter element 36, a greater proportion of exhaust flow is directed near the interior walls 43 of the DPF 27 through the filter element 36, thereby assisting in the regeneration of the DPF in those outer regions. The use of a flow redirection device such as block plate 38 has been found by applicant to significantly reduce the thermal gradients in the DPF and thereby facilitate complete regeneration of the device with less heating required.

In particular, the method of operation for regeneration with such a particulate aftertreatment device therefore comprises (i) during normal operation (i.e. loading of the particulate trap) the block plate 38 is away from the DPF, thereby allowing soot to collect evenly inside the DPF and minimize the pressure drop (and flow losses) across the unit, (ii) during the initial phase of regeneration, the block plate is moved toward the DPF, thereby causing the heated gas to flow around an outer annular volume of the DPF and allowing the soot in these outer regions to begin oxidation first, prior to ignition of the soot in the central volume of the DPF, and (iii) after detection of the initial light-off event, or after some other optimal time period as experimentally determined, the block plate is then moved away again from the DPF thereby facilitating carbon burn to propagate from the initial outer annular volume to the inside cone volume of the DPF for complete regeneration of the particulate filter.

In an alternative embodiment (not shown), block plate 38 could be configured for slidable radial movement instead, and allowing the block plate to be removed from the exhaust flow path as desired, e.g., with a stem radially extending from the side of the plate to an actuation device outside of the DPF. In such an embodiment, by sliding plate 38 into the DPF to partially block exhaust gas flow, a greater proportion of exhaust flow is again directed near the interior walls 43 of the DPF 27 through the filter element 36, thereby assisting in the regeneration of the DPF in those outer regions.

It will be understood that various modifications could be made in the invention disclosed herein without departing from the inventive principles described above. Accordingly, the invention is not limited herein except by the claims.

I claim:

1. An internal combustion engine system, comprising:
   a plurality of combustion cylinders, comprising a first sub-plurality of combustion cylinders and a second single combustion cylinder;
   a first particulate filter in fluid communication with the first sub-plurality of combustion cylinders and the second single combustion cylinder, for receipt of exhaust gas from the combustion cylinders;
   an oxidation catalyst upstream of the first particulate filter;
   a monitoring device for monitoring the need of the first particulate filter to be regenerated;
   a valve controller configured, upon indication of a need of the first particulate filter to be regenerated, to prevent flow of exhaust gas from the first sub-plurality of combustion cylinders to the first particulate filter during regeneration of the first particulate filter, but to allow flow of exhaust gas from the second single combustion cylinder to the first particulate filter during regeneration of the first particulate filter;

a fuel injection system controller programmed, upon indication of a need of the first particulate filter to be regenerated, to inject fuel into the separate single combustion cylinder in at least two parts, with a first fraction of fuel primarily provided to produce a target cylinder power while a subsequent fraction of fuel injected provides additional fuel to react across the oxidation catalyst to increase the temperature of the exhaust gas upstream of the first particulate filter;

a heater upstream of the first particulate filter; and a flow redirection device configured to direct exhaust gas flow toward outer portions of the first particulate filter.

2. The internal combustion engine system of claim 1, wherein the flow redirection device comprises a block plate slidably positioned downstream of the first particulate filter.

3. The internal combustion engine system of claim 2 wherein, when there is not an indication of a need for regeneration of the first particulate filter, the block plate is moved away from the first particulate filter.

4. The internal combustion engine system of claim 3 wherein, during an initial phase of regeneration, the block plate is moved toward the first particulate filter.

5. The internal combustion engine system of claim 4 wherein, after detection of an initial light-off event, the block plate is then moved away again from the first particulate filter, for complete regeneration of the first particulate filter.

6. A method of regenerating particulate filters for a multicylinder internal combustion engine system, comprising:

upon indication of a need for a particulate filter to be regenerated, adding fuel to exhaust gas of a single combustion cylinder of the multicylinder internal combustion engine by a subsequent additional injection of fuel after a main injection of fuel provided to produce a target cylinder power, to increase the fuel content of the exhaust gas produced by the single combustion cylinder;

passing the exhaust gas from the single combustion cylinder through a particulate filter;

directing the exhaust gas from the remaining combustion cylinders of the multicylinder internal combustion engine away from the particulate filter during its regeneration;

managing combustion in the single combustion cylinder to provide an exhaust oxygen concentration higher than the exhaust oxygen concentration provided by the remaining combustion cylinders of the multicylinder internal combustion engine; and maintaining relatively constant from cycle to cycle the exhaust oxygen concentrations provided by combining the single combustion cylinder exhaust with the exhaust from the remaining combustion cylinders.

7. A method for controlling regeneration of a particulate trap, comprising:

during normal loading of the particulate trap, moving a flow redirection device away from the trap filter, thereby allowing soot to collect evenly inside the trap;

during an initial phase of regeneration, axially sliding the entire flow redirection device toward the filter, thereby causing heated gas to flow around an outer annular volume in the particulate trap and allowing soot in said outer annular volume to begin oxidation prior to ignition of soot in the center of the particulate trap; and after detection of initial light-off, axially sliding the entire flow redirection device away again from the filter, thereby facilitating propagation of carbon burn from the outer annular volume to the remaining inside volume of the particulate trap for complete regeneration of the particulate filter.

8. The method of claim 7, wherein the flow redirection device comprises a block plate.

* * * * *